United States Patent [19]

Kim

[11] Patent Number: 5,706,703
[45] Date of Patent: Jan. 13, 1998

[54] PARKING BRAKE DEVICE IN COMBINATION WITH A SHIFT LEVER FOR USE IN A VEHICLE

[75] Inventor: Jong-gun Kim, Seoul, Rep. of Korea

[73] Assignee: Hyundai Motor Company, Ltd., Seoul, Rep. of Korea

[21] Appl. No.: 581,485

[22] Filed: Dec. 29, 1995

[51] Int. Cl.$^6$ ............... B60K 20/02; G05G 1/04
[52] U.S. Cl. ............... 74/477; 74/483 R; 192/4 A
[58] Field of Search ............... 74/473 R, 477, 74/481, 483 R; 192/4 A

[56] References Cited

U.S. PATENT DOCUMENTS

| | | | |
|---|---|---|---|
| 3,780,839 | 12/1973 | Schroeder | 74/473 R |
| 4,084,448 | 4/1978 | Wolfe | 74/473 R X |
| 4,371,063 | 2/1983 | Troemner et al. | 74/473 R |
| 4,796,736 | 1/1989 | Fee et al. | 74/473 R |
| 4,846,322 | 7/1989 | Swank | 192/4 A |
| 4,875,563 | 10/1989 | Larson et al. | 192/4 A |
| 5,062,509 | 11/1991 | Carpenter et al. | 192/4 A |
| 5,086,895 | 2/1992 | Nemoto | 74/473 R |
| 5,295,412 | 3/1994 | Donato et al. | 74/473 R |

FOREIGN PATENT DOCUMENTS 5-16018  4/1993  Japan.

*Primary Examiner*—Khoi Q. Ta
*Attorney, Agent, or Firm*—Birch, Stewart, Kolasch & Birch, LLP

[57] ABSTRACT

A parking brake device includes a shift lever pivotally supported on a bracket, a position fixing shaft movably disposed on a shift lever, a support shaft movably disposed on the shift lever and operatively linked with the position fixing shaft, a toothed member fixed to the shift lever, a parking brake cable supported on the bracket, and a hook member pivotally fixed to said support shaft and having a sharp portion and a hook portion at opposing ends thereof whereby upon moving of the shift lever, the hook member is locked with or released from the toothed member and the parking brake cable correspondingly engages with or disengages from the parking brake.

5 Claims, 1 Drawing Sheet

PARKING BRAKE DEVICE IN COMBINATION WITH A SHIFT LEVER FOR USE IN A VEHICLE

BACKGROUND OF THE INVENTION

1. Field of the Invention

The present invention is directed to a parking brake device in combination with a shift lever for use in a vehicle, and more particularly, to an improved parking brake device attached to a shift lever for an automatic transmission as a composite structure, so that a conventional parking brake lever can be dispensed with.

2. Description of Related Art

Generally, in a conventional vehicle, there is a shift lever for an automatic transmission, which selects a transmitting mode by forward and backward movement in a lock releasing state upon pressing a button on the top thereof, and a separate parking brake lever disposed on the back side of the shift lever.

However, such a conventional parking brake device suffers from a number of problems, for example, when parking, the driver must operate both the shift lever and the parking brake lever. It disadvantageously requires additional interior space of the vehicle since the shift and parking brake levers must be installed within the vehicle. Further, the conventional parking brake device is expensive to manufacture since there are many parts and increased labor is necessary to install the complicated conventional parking brake device.

In order to solve the problems associated with the conventional parking brake devices, Japanese Laid-Open Utility Model No. 5-16018 discloses a transmission lever as a parking brake device, which includes a transmission lever and a parking brake adjacent to the transmission lever for toppling in every direction, respectively, whereby in a brake lever non-operating area, the transmission lever engages with selective gears, and in a brake operating area, the transmission lever engages with a brake lever for operating the parking brake. However, the Japanese Laid-Open Utility Model No. 5-16018 is structurally and functionally different from the parking brake device of the present invention in which the parking brake lever is omitted in its entirety. Additionally, the Japanese Utility Model has a complicated structure compared to the present invention.

SUMMARY OF THE PRESENT INVENTION

Accordingly, it is an object of the present invention to provide an improved parking brake device in combination with a shift lever for use in a vehicle, which eliminates the above problems encountered with conventional parking brake devices.

Another object of the present invention is to provide a parking brake device including a shift lever pivotally supported on a bracket, a position fixing shaft movably disposed on a shift lever, a support shaft movably disposed on the shift lever and operatively linked with the position fixing shaft, a toothed member fixed to the shift lever, a parking brake cable supported on the bracket, and a hook member pivotally fixed to said support shaft and having a sharp portion and a hook portion at opposing sides thereof whereby upon moving of the shift lever, the sharp portion is locked with or released from the toothed member and the hook member is engaged with or released from the parking brake cable for engaging or disengaging the parking brake.

Still another object of the present invention is to provide a parking brake device in combination with a shift lever, which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a parking brake device in combination with a shift lever for use in an automatic transmission of a vehicle, including a position fixing shaft movably disposed on the shift lever, a support shaft linked with the position fixing shaft, and a hook member pivotally and resiliently attached to the support shaft and having a sharp portion and a hook portion at opposing sides thereof for selectively locking with or releasing from a toothed member and a parking brake cable selectively engaging the parking brake, thereby omitting a separate parking brake lever.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
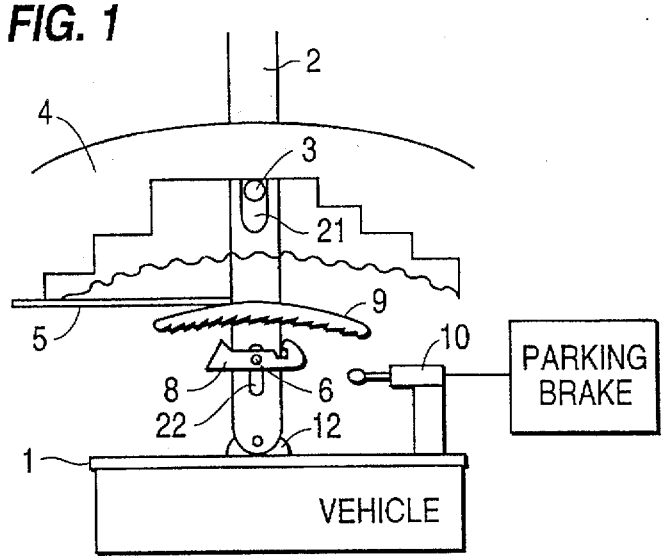
FIG. 1 is a somewhat diagrammatic sectional view of the parking brake device in combination with a shift lever for use in a vehicle according to the present invention.
Figure 2:
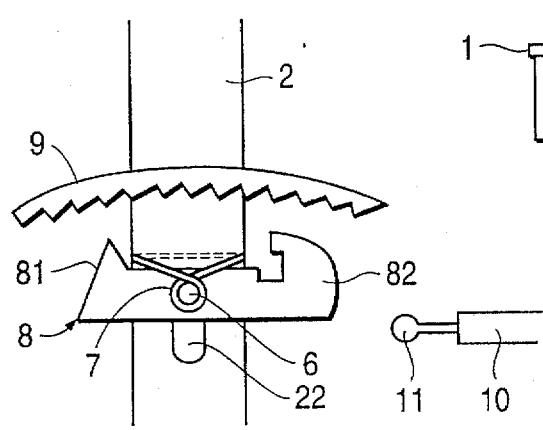
FIG. 2 is a sectional view of the parking brake in combination with a shift lever for use in a vehicle according to the present invention in a normal standby position.
Figure 3:
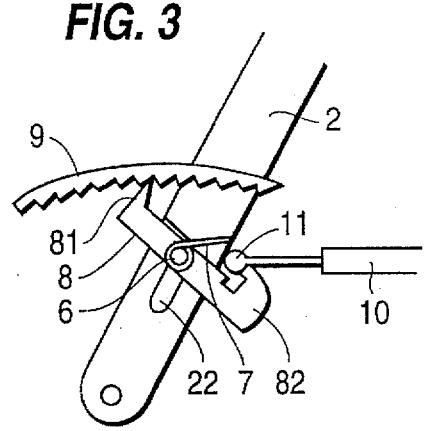
FIG. 3 is a sectional view of the parking brake in combination with a shift lever for use in a vehicle according to the present invention in a parking operating position.

Referring now in detail to the drawings for the purpose of illustrating preferred embodiments of the present invention, the parking brake device in combination with a shift lever for use in a vehicle as shown in FIGS. 1, 2 and 3, includes a shift lever 2, a position fixing shaft 3 disposed within an upper portion of the shift lever 2 for a shift cable 5 to select an operational mode, a support shaft 6 disposed within a lower portion of the shift lever 2, and disposed below and linked with the position fixing shaft 3 through a bar 33 (FIG. 4), a hook member 8 pivotally connected to the support shaft 6, a toothed member 9, and a parking brake cable 10 having a projecting head 11 whereby the hook member 8 selectively engages with the parking brake cable 10 for engaging or disengaging the parking brake (not shown). The hook member 8 has a c-shaped configuration.

The shift lever 2 is fixed to a support bracket 1 through a hinge 12 for moving forward and backward in response to a shift mode selection made by operating the shift cable 5. The position fixing shaft 3 is disposed within a first vertical guide slot 21 and movable downward along the first vertical guide slot 21.

As shown in FIGS. 2 and 3, the support shaft 6 is disposed within a second vertical guide slot 22 and movable downward along the second vertical guide slot 22. The support shaft 6 is fixed by a resilient member 7 such as a spring biased against the shift lever 2. The spring 7 has an γ-shaped configuration.

Also, the hook member 8 includes a sharp portion 81 disposed on a left side thereof for gearing with one of a plurality of teeth 19 of the fixed toothed member 9 fixed to the shift member 2 and disposed over the hook member 8, and a hook portion 82 disposed on an opposing end thereof for locking the projecting head 11 of the parking brake cable 10 fixed to the support bracket 1 (FIG. 1).

The parking brake device according to the present invention operates as follows. When the position fixing shaft 3 of the shift lever 2 is locked in a certain position on a mode selecting plate 4, and a mode change is needed, the driver presses a button 30 disposed on the top of the shift lever 2, thereby moving the position fixing shaft 3 to the lower end of the first vertical guide slot 21. At this time, the position fixing shaft 3 is released from the certain position on the mode selecting plate 4 and the shift lever 2 is movable either forward or rearward.

Figure 4:
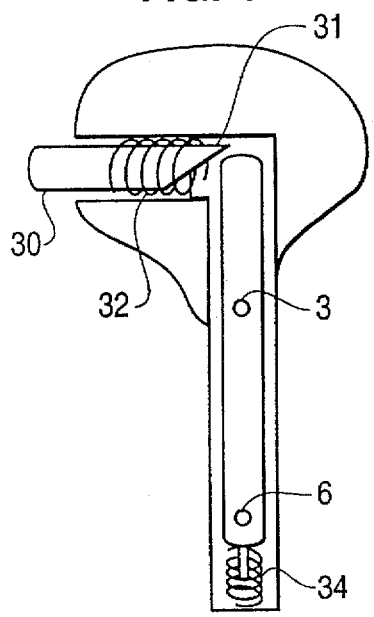
FIG. 4 is a somewhat diagrammatic sectional view of a push button and a bar of the shift lever for use in a vehicle according to the present invention.

Also, as shown in FIG. 2, since the push button 30 has a tapered end 31 for pushing downward the bar 33 containing the position fixing shaft 3 and the support shaft 6 (FIG. 4), the support shaft 6 correspondingly moves downward along the second vertical guide slot 22. The push button 30 and the bar 33 have a first spring 33 and a second spring 34, respectively, so that when the push button 30 is released, the bar 33 is returned to the original position (FIG. 4). However, the hook member 8 is in a transverse orientation with respect to the shift lever 2 due to the biasing force of the resilient member 7.

As shown in FIG. 3, when the shift lever 2 is moved backward upon parking the vehicle, the hook member 8 also moves backward with the shift lever 2. The hook portion 82 of the hook member 8 then locks with the projecting head 11 of the parking brake cable 10 and the shift lever 2 completes the backward motion. Thereafter the driver releases the button of the shift lever 2.

Accordingly, the support shaft 6 moves upward to return to the original position by the biasing force of the resilient member 7 and simultaneously the hook member 8 is rotated in a clockwise direction. Therefore, the sharp portion 81 of the hook member 8 is engaged with one of the plurality of teeth 19 of the toothed member 9. Accordingly, the parking brake cable 10 is pulled and engages the parking brake. Of course, the hook member 8 does not rotate any further.

When a mode change is requested to release the parking state, the driver first pushes the shift lever 2 forward and presses the button of the shift lever 2, the support shaft 6 with the hook member 8 is then moved downward, so that the sharp portion 81 is separated from the engaged tooth 19 of the toothed member 9.

Secondly, when the driver moves the shift lever 2 slightly backward, the projecting head 11 of the parking brake cable 10 separates from the hook portion 82 of the hook member 8 and the parking brake cable 10 returns to an original position thereby releasing the parking brake. Immediately, the shift lever 2 may be moved forward and the button of the shift lever 2 may be released. Simultaneously, the support shaft 6 with the hook member 8 is returned to its original position.

Accordingly, the parking brake device in combination with a shift lever 2 for an automatic transmission includes the hook member 8 pivotally fixed to the support shaft 6 which is resiliently fixed to the shift lever 2. The shift lever 2 is selectively operated to engage or disengage the parking brake, with the single lever, whereby it is easy for the driver to operate, inexpensive to manufacture, enables effective utilization of the space within a vehicle, and eliminates the use of a separate parking brake lever.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A parking brake device in a vehicle, comprising:

a shift lever pivotally connected to a bracket of said vehicle;

a position fixing shaft operatively movable within a first vertical guide slot formed within an upper portion of said shift lever, said position fixing shaft engaging a mode selecting plate;

a support shaft mounted to said shift lever through a resilient member and operatively movable within a second vertical guide slot formed in a lower portion of said shift lever, said support shaft being linked with said position fixing shaft;

a toothed member disposed over said support shaft and fixed to said shift lever, said tooth member having a plurality of engageable teeth formed thereon;

a parking brake cable supported on said bracket, said parking brake cable including a projecting head; and a hook member pivotally fixed to said support shaft, said hook member including a tooth engaging portion at one end thereof for engaging with one of the plurality of engaging teeth of said toothed member, and a hook portion formed at an opposing end thereof for locking with the projecting head of said parking brake cable, whereby when said shift lever is moved, said hook member engages with said toothed member and the projecting head of said parking brake cable for activating the parking brake.

2. The parking brake device of claim 1, wherein said hook member has a c-shaped configuration.

3. The parking brake device of claim 1, wherein said resilient member is a spring.

4. The parking brake device of claim 3, wherein said spring has an γ-shaped configuration.

5. The parking brake device of claim 1, wherein said position fixing shaft is linked with said support shaft through a bar.

* * * * *